(12) United States Patent
Milne

(10) Patent No.: US 10,855,921 B2
(45) Date of Patent: Dec. 1, 2020

(54) TECHNIQUES FOR CONTROLLING CAMERA INTERFACES USING VOICE COMMANDS

(71) Applicant: Sony Corporation, Tokyo (JP)

(72) Inventor: James R. Milne, Ramona, CA (US)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 16/397,777

(22) Filed: Apr. 29, 2019

(65) Prior Publication Data
US 2020/0344415 A1 Oct. 29, 2020

(51) Int. Cl.
H04N 5/232 (2006.01)
G10L 15/22 (2006.01)

(52) U.S. Cl.
CPC ........ H04N 5/23245 (2013.01); G10L 15/22 (2013.01); H04N 5/23203 (2013.01); *G10L 2015/223* (2013.01)

(58) Field of Classification Search
CPC H04N 5/23245; H04N 5/23203; G10L 15/22; G10L 2015/223
See application file for complete search history.

(56) References Cited

U.S. PATENT DOCUMENTS

| | | | |
|---|---|---|---|
| 4,951,079 A | 8/1990 | Hoshino et al. | |
| 5,980,124 A * | 11/1999 | Bernardi | F16M 11/18 396/428 |
| 7,813,630 B2 * | 10/2010 | Chou | G03B 17/40 396/56 |
| 8,958,848 B2 | 2/2015 | Shin et al. | |
| 9,031,847 B2 * | 5/2015 | Sarin | H04N 5/232 704/275 |
| 9,619,200 B2 | 4/2017 | Chakladar et al. | |
| 2003/0025796 A1 * | 2/2003 | Yamagishi | H04N 1/00188 348/207.2 |
| 2005/0118990 A1 * | 6/2005 | Stephens | H04N 1/00403 455/418 |
| 2008/0036869 A1 * | 2/2008 | Gustafsson | G10L 21/16 348/222.1 |
| 2008/0192129 A1 * | 8/2008 | Walker | G11B 27/34 348/231.2 |
| 2011/0103789 A1 * | 5/2011 | Honjo | H04N 5/23209 396/530 |
| 2013/0124207 A1 | 5/2013 | Sarin et al. | |

(Continued)

FOREIGN PATENT DOCUMENTS

| | | |
|---|---|---|
| EP | 2041957 A1 | 4/2009 |
| EP | 3160128 A1 | 4/2017 |
| JP | 2002057928 | 2/2002 |

OTHER PUBLICATIONS

Mark Robertston, "Finally, A Hands-Free Camera that Responds to Voice Commands", Adventure Journal, Sep. 1, 2016. Retrieved from https://www.adventure-journal.com/2016/09/finally-a-hands-free-camera-that-responds-to-voice commands/.

(Continued)

*Primary Examiner* — Lin Ye
*Assistant Examiner* — John H Morehead, III
(74) *Attorney, Agent, or Firm* — John L. Rogitz

(57) ABSTRACT

Voice commands may be used to control camera functions, obviating the need for cumbersome menu manipulation. Voice commands may be enabled only for certain camera modes, e.g., for P, A, and S modes but not for auto mode.

20 Claims, 4 Drawing Sheets

(56) References Cited

U.S. PATENT DOCUMENTS

| 2014/0160316 A1 | 6/2014 | Hwang | |
| 2015/0215514 A1* | 7/2015 | Barabas | H04W 4/80 |
| | | | 348/211.2 |
| 2016/0080672 A1 | 3/2016 | Braun et al. | |
| 2017/0019580 A1* | 1/2017 | Boghosian | G11B 27/031 |
| 2019/0149673 A1* | 5/2019 | Aizawa | H04N 21/2187 |
| | | | 348/207.1 |

OTHER PUBLICATIONS

Brant Candelore, "Reducing Variable-Length Pre-Key to Fix-Length Key", Applicant's response to Final Office Action filed Jul. 17, 2020 from related U.S. Appl. No. 16/183,532.

Brant Candelore, "Reducing Variable-Length Pre-Key to Fix-Length Key", Final Office Action dated Jul. 7, 2020 from related U.S. Appl. No. 16/183,532.

* cited by examiner

TECHNIQUES FOR CONTROLLING CAMERA INTERFACES USING VOICE COMMANDS

FIELD

The present application relates generally to techniques for controlling camera interfaces using voice commands.

BACKGROUND

A problem recognized by present principles is being able to get to a camera setup menu or setting quickly and easily. Cameras tend to have complicated menu systems that make it difficult to find or even search for particular camera settings.

SUMMARY

Rather than fumble around a digital camera's menu systems trying to find the desired adjustment, much easier voice control is implemented to be able to make changes to various camera settings. For example, the user can, via voice command, tell the camera to enter bulb mode rather than having to keep adjusting shutter speed until bulb mode is eventually attained. The processor for recognizing the key words may exist inside the camera or a remote control wirelessly communicating with the camera. The voice control may be activated via key word or by pressing a button (e.g., a shutter button half-press or a button on a remote).

Voice control may be implemented only certain modes (e.g., only in one or more of P, A, S or M) and not in auto mode. Or, voice control may be implemented only under auto mode, or it may be implemented with all modes.

Voice commands initially may be limited to a key word set, with subsequent firmware updates adding more functionality as it becomes available. The memory recall (MR) settings may also be changed using voice commands to enable the camera to have more than two or three settings (e.g., button or mechanical limitations). Voice commands may be used to transfer files to a smart phone, laptop, or other smart device.

Moreover, searches for camera functions may be executed responsive to a voice command such as "search auto focus". Results of the search may be presented on the camera display, which may be a liquid crystal display (LCD) that may be touch sensitive for the user to select the particular search item and thereby cause the appropriate menu to be presented.

Additionally, voice recognition may be implemented as a biometric feature of the camera to securely lock and unlock the camera functionality. A finger print sensor may be provided on the shutter button or other surface of the camera to provide a further biometric lock/unlock feature. Biometric features may be activated and inactivated using a menu or a voice command.

If a remote is used to control the camera, communication between the remote and camera may be implemented using Wi-Fi to enable file transfers, although other protocols such as Bluetooth may be used for commands that do not require as much bandwidth as file transfers.

Accordingly, in one aspect a system includes at least one computer medium that is not a transitory signal and that in turn includes instructions executable by at least one processor to receive, using a sound transducer, at least one voice command, and establish at least one function of at least one camera according to the at least one voice command.

In examples, the function can include entering a bulb mode, in which the camera keeps taking a picture for as long as a picture key is depressed.

In non-limiting embodiments, the instructions may be executable to enable voice control of the camera responsive to receiving a key word or phrase. In some embodiments the instructions can be executable to enable voice control of the camera responsive to receiving a signal from a key on the camera or on a remote control communicating with the camera.

In some embodiments the instructions can be executable to compare the voice command to a key word set, and responsive to the voice command matching an element in the key word set, execute the voice command according to information correlated to the element in the key word set. The instructions may be executable to, responsive to the voice command not matching an element in the key word set, ignore the voice command. The instructions may be further executable to augment the key word search using a firmware update.

In one implementation the function includes executing a search for information responsive to the voice command and the instructions can be executable to present results of the search for information on a display.

The system may include the processor, which may be implemented in the camera or a remote-control device wirelessly communicating with the camera.

In another aspect, a system includes at least one computer medium that is not a transitory signal and that in turn includes instructions executable by at least one processor to receive, using a sound transducer, at least one voice command. The instructions are executable to, responsive to a camera being in a first mode, establish at least one function of the camera according to the voice command. The instructions also are executable to, responsive to the camera being in a second mode, ignore the voice command.

In another aspect, a method includes, responsive to identifying that a file transfer is to be executed between a camera and a remote-control device, establishing a Wi-Fi link between the camera and the remote-control device to transfer the file. The method also includes, responsive to identifying that a command is to be transferred between the camera and the remote-control device, establishing a Bluetooth link between the camera and the remote-control device to transfer the command.

The details of the present application, both as to its structure and operation, can be best understood in reference to the accompanying drawings, in which like reference numerals refer to like parts, and in which:

DETAILED DESCRIPTION

Figure 1:
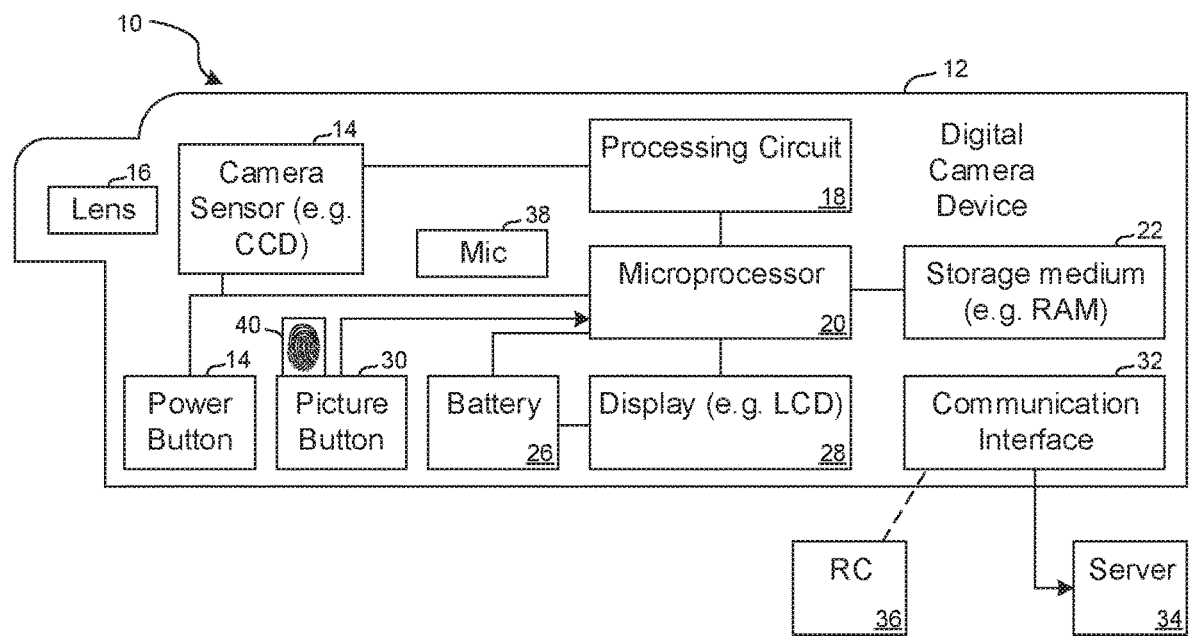
FIG. 1 is a block diagram of an example imaging device.

This disclosure relates generally to computer ecosystems including aspects of camera and other imaging ecosystems. A system herein may include server and client components, connected over a network such that data may be exchanged between the client and server components. The client components may include one or more computing devices such as portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, operating systems from Microsoft, or a Unix operating system, or operating systems produced by Apple Computer or Google. These operating environments may be used to execute one or more browsing programs, such as a browser made by Microsoft or Google or Mozilla or other browser program that can access web applications hosted by the Internet servers discussed below.

Servers may include one or more processors executing instructions that configure the servers to receive and transmit data over a network such as the Internet. Or, a client and server can be connected over a local intranet or a virtual private network.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website to network members.

As used herein, instructions refer to computer-implemented steps for processing information in the system. Instructions can be implemented in software, firmware or hardware and include any type of programmed step undertaken by components of the system.

A processor may be any conventional general-purpose single- or multi-chip processor that can execute logic by means of various lines such as address lines, data lines, and control lines and registers and shift registers. A processor may be implemented by a digital signal processor (DSP), for example.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library.

Present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits described below can be implemented or performed with a general-purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not limited to C # or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hardwired cables including fiber optic and coaxial wires and digital subscriber line (DSL) and twisted pair wires.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Referring initially to FIG. 1, a digital camera 10 includes a portable lightweight hand-held housing 12 holding a camera sensor 14 such as but not limited to a charge-coupled device (CCD). The sensor 14 produces images sensed through a lens 16, and in the example non-limiting embodiment shown the images are sent to a processing circuit.

In turn, the processing circuit 18 may communicate with a camera processor 20 in the housing 12, which can access and store data on a computer-readable medium 22. The medium 22 may be, without limitation, disk-based storage and/or solid-state storage and in one implementation is implemented by random access memory (RAM). To activate the camera 10, a power button 24 may be provided on the housing 12. A user can manipulate the power button 24 to cause one or more camera batteries 26 to energize the components of the camera 10, including the processor 20 and a visual display 28 such as but not limited to a liquid crystal display (LCD). Also, a picture key 30 typically is provided on the housing 12 that can be manipulated by a user to signal the user's desire to capture a frame (or, in the case of a video camera, multiple frames) as a picture, it being understood that the term "picture key" refers to any hard or soft user-manipulable element that causes the camera to capture an image or images.

Also, one or more wireless network communications interfaces 32 such as but not limited to a Wi-Fi interface or a Bluetooth or other interface may be provided to enable the camera processor 20 to communicate with one or more servers 34 and/or one or more remote control (RC) devices 36 described below over the Internet or other network or direct point to point. In other embodiments, a wired communication interface may be used. In any case, it is to be understood that the camera 10 may be implemented as an electronic device with an imaging sensor and storage such as digital cameras per se, camera-equipped mobile phones, personal digital assistants (PDAs), and notebook computers with built in cameras. It is to be understood that the RC 36 includes processing circuitry, wireless transceiver circuitry, control keys, etc. to permit the RC 36 to control the camera 10. One or more sound-to-electrical transducers 38 such as microphones may be provided on the camera for purposes to be shortly disclosed. If desired, a finger print reader 40 may be provided on, e.g., the picture key 30 as shown.

Prior to disclosing logic below it is to be understood that the logic herein may be executed by the camera processor 20, the processor of the remote-control device 36 when provided and in communication with the camera, or a combination thereof.

Figure 2:
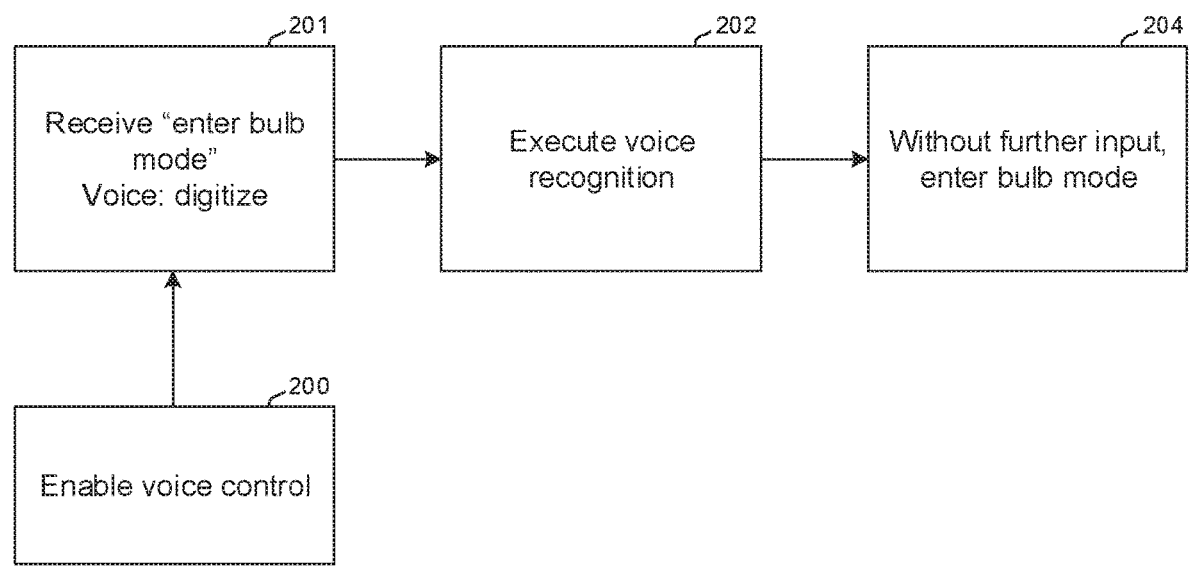
FIG. 2 is a flow chart of example logic consistent with present principles for using a voice command to enter the bulb mode of the camera.

Now referring to FIG. 2, voice control in which voice commands received by the microphone 38 and digitized are recognized and compared against key words to ascertain their meanings can be enabled at block 200. Enablement may be accomplished at block 200 by a user speaking a key word or phrase (such as "activate voice") and/or by manipulating a key on the camera or the RC 36, e.g., by implementing a half-press of the picture key 30 or a press of a key on the RC 36.

Moving to block 201, a user can, via voice command, cause the camera to enter bulb mode, in which the camera keeps taking a picture for as long as the picture key 30 is depressed, rather than having to keep adjusting shutter speed until bulb mode is eventually attained. This command is executed at block 202 such that at block 204, without further user voice or manual input, the camera automatically enters the bulb mode.

Figure 3:
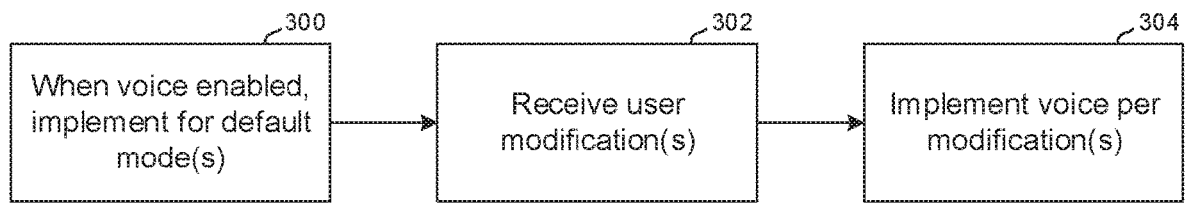
FIG. 3 is a flow chart of example logic consistent with present principles for enabling voice commands for only certain camera modes.

Voice control of the camera may be implemented only for certain modes of the camera. FIG. 3 illustrates. Commencing at block 300, assuming voice control is enabled as described above, voice commands may be executed (voice control may be implemented) only for a default set of camera modes. Thus, voice control may be implemented for only certain modes (e.g., only in one or more of Program, Aperture priority. Shutter priority, or Manual) and not in auto mode. Or, voice control may be implemented only under auto mode, or it may be implemented with all modes. Note that for present purposes, in Program mode, the processor selects the optimum shutter speed and aperture. In Aperture priority mode, the user establishes the aperture setting using voice commands if desired (e.g., "set aperture wide") and based on that the processor establishes the shutter speed. In Shutter priority mode the user establishes shutter speed using voice commands if desired (e.g., "set speed high") and based on that the processor establishes the aperture setting for optimum exposure. In Manual mode the user establishes the camera settings including both aperture and shutter speed using voice commands if desired. In Auto mode the processor establishes camera settings including shutter speed, focus, and aperture.

Figure 4:
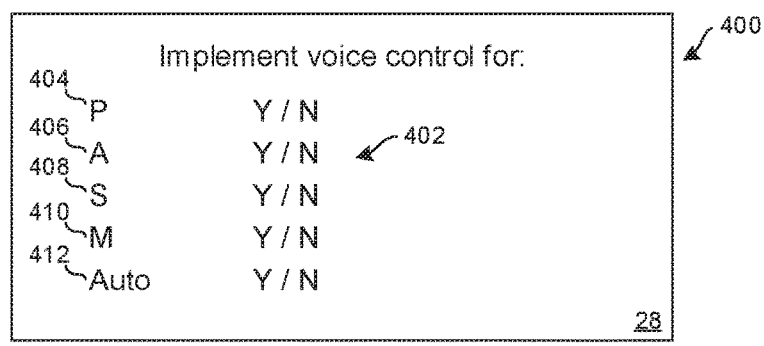
FIG. 4 is a screen shot of an example user interface (UI) that may be presented on the camera or the remote-control attendant to the logic of FIG. 3.

If desired, user modifications to the default set of modes for which voice control is activated may be received at block 302 and voice control implemented at block 304 per the modifications. FIG. 4 provides an example illustration.

A UI 400 may be presented on the display 28 of the camera (or on a display of the RC when the RC 36 is used for the described purposes in addition to or in lieu of the camera processor) in which one or more selectors 402 may be selected by a user to designate modes for which voice control is to be implemented. In this way, as shown at 404, the user may select to implement voice control for the Program mode. As shown at 406, the user may select to implement voice control for the Aperture priority mode. As shown at 408, the user may select to implement voice control for the Shutter priority mode. As shown at 410, the user may select to implement voice control for the Manual mode. As shown at 412, the user may select to implement voice control for the auto mode.

Figure 5:
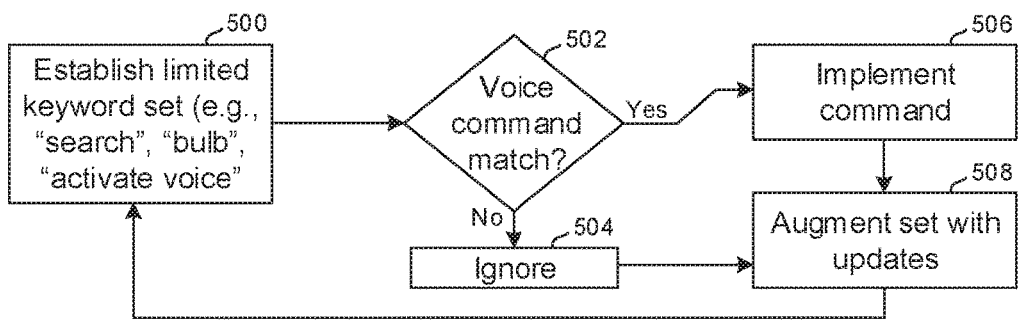
FIG. 5 is a flow chart of example logic consistent with present principles for using a limited key word set in voice command implementation.

Now referring to FIG. 5, at block 500 voice commands initially may be limited to a key word set (such as "bulb" to execute the logic of FIG. 2, "search" to execute the logic of FIG. 6 described below, and "activate voice" to enable voice control at block 200 of FIG. 2). Thus, when a voice command is received by the microphone, voice recognition is executed to determine if the command matches a command in the key word set and if it does not, the command is ignored at block 504. However, if a received command matches a command in the key word set, the command is duly implemented at block 506.

Block 508 indicates that subsequent firmware updates can add more functionality as it becomes available. The memory recall (MR) settings may also be changed using voice commands to enable the camera to have more than two or three settings (e.g., button or mechanical limitations). Voice commands may be used to transfer files to a smart phone, laptop, or other smart device.

Figure 6:
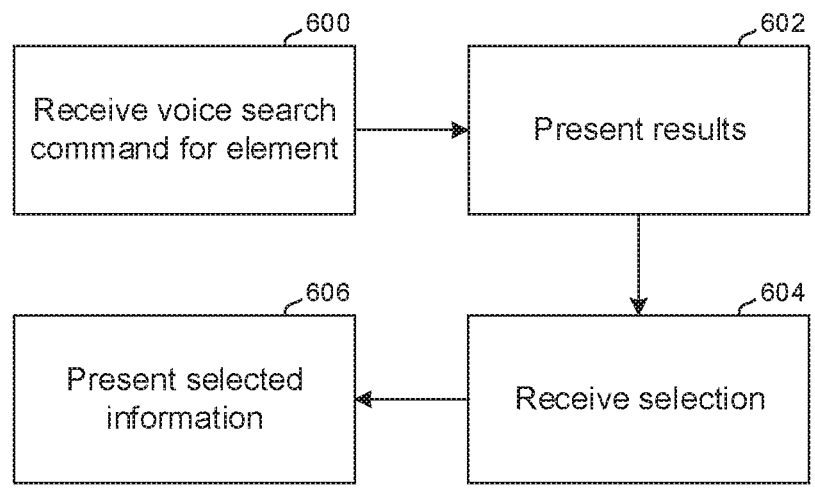
FIG. 6 is a flow chart of example logic consistent with present principles for voice search queries.

Moreover, and turning now to FIG. 6, searches for camera functions may be executed responsive to a voice command at block 600 such as "search auto focus". Results of the search may be presented at block 602 on the camera display, which may be a liquid crystal display (LCD) that may be touch sensitive for the user to select at block 604 the particular search item and thereby cause the appropriate menu to be presented at block 606.

Figure 7:
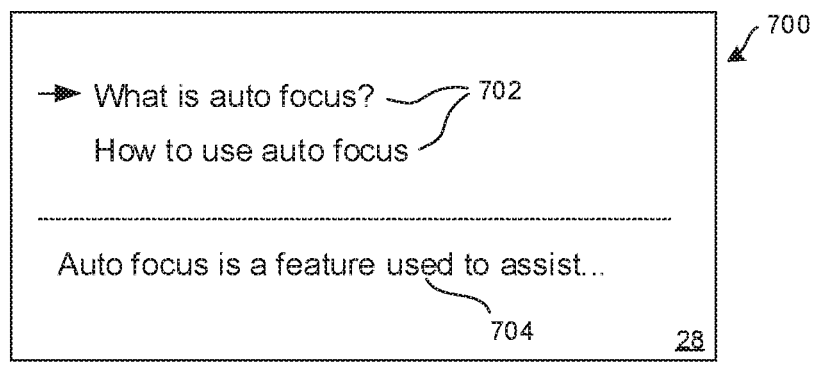
FIG. 7 is a screen shot of an UI that may be presented on the camera or the remote-control attendant to the logic of FIG. 6.

FIG. 7 illustrates. A UI 700 may be presented on the display 28 (and/or on the remote control 36) in which it is assumed that the voice command at block 600 was "search autofocus". Two results 702 of the search from, e.g., an Internet search or an internal database search are presented in the example shown. The user has selected one of the results as indicated by the arrow in FIG. 7 to cause the selected information to be presented at 704.

Figure 8:
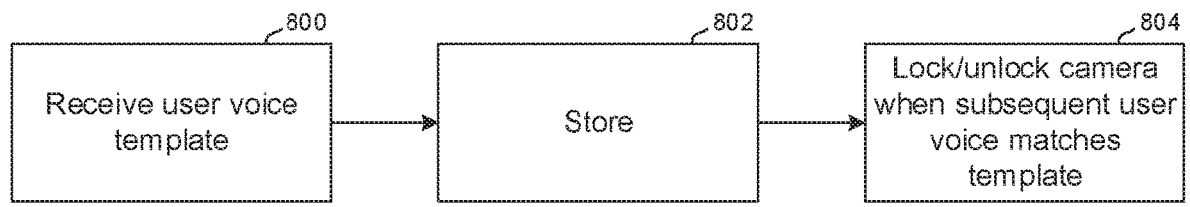
FIG. 8 is a flow chart of example logic consistent with present principles for using voice signals as a biometric lock/unlock mechanism for the camera.

Additionally, and turning now to FIG. 8, voice recognition may be implemented as a biometric feature of the camera to securely lock and unlock the camera functionality. Commencing at block 800, an authorization voice template is received and stored at block 802. Subsequently the camera may be locked and unlocked for use at block 804 when an appropriate command is received and (1) the command is recognized as matching a lock or unlock key word, and (2) the user voice matches the voice template received at block 800.

Figure 9:
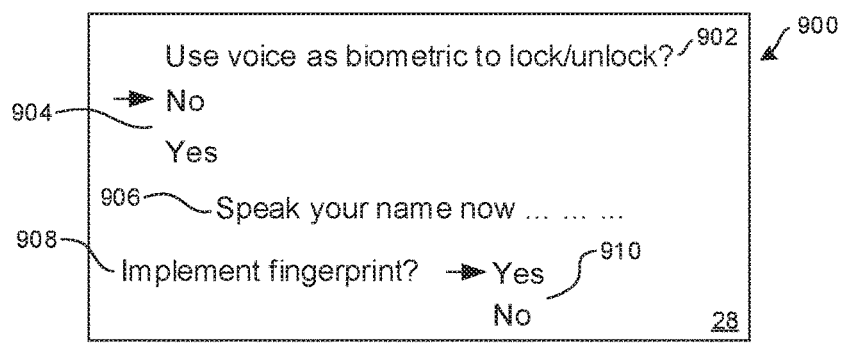
FIG. 9 is a screen shot of an UI that may be presented on the camera or the remote-control attendant to the logic of FIG. 8.

FIG. 9 illustrates further. A UI 900 may be presented on the camera (and/or RC) prompting the user as indicated at 902 to select to use voice as a biometric key to permit or disallow operation of the camera. One or more selectors 904 may be presented and may be selected to enable voice as a biometric lock/unlock feature. If voice is selected, a prompt 906 may be presented for the user to speak and thereby establish the authorization template in block 800 of FIG. 8.

Additionally, as indicated at 908 in FIG. 9 the user may, in addition to or in lieu of enabling voice as a biometric lock/unlock feature, enable finger print signals from the sensor 40 in FIG. 1 to be used as a biometric unlock/lock feature. Selectors 910 may be presented to permit the user to enable fingerprint lock/unlock operation to provide a further biometric lock/unlock feature. Biometric features may be activated and inactivated using a menu or a voice command.

Figure 10:
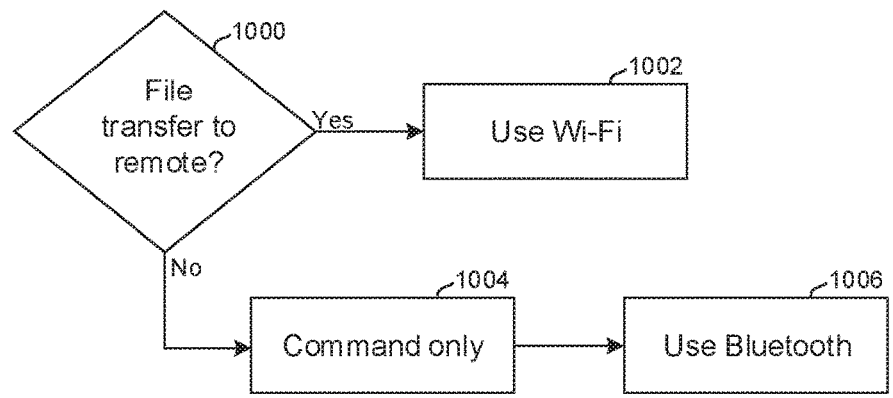
FIG. 10 is a flow chart of example logic consistent with present principles for determining which wireless protocol to use in communication between the camera and remote control.

FIG. 10 illustrates that when the RC 36 is used to control the camera, if it is determined at decision diamond 1000 that a file transfer (e.g., a photograph) is to be implemented between the camera and RC, communication between the remote and camera may be implemented using Wi-Fi at block 1002. However, for commands to be transferred (which are much smaller data-wise than files) at block 1004, other protocols such as Bluetooth may be used at block 1006 for commands that do not require as much bandwidth as file transfers.

While the particular embodiments are herein shown and described in detail, it is to be understood that the subject matter which is encompassed by the present invention is limited only by the claims.

What is claimed is:

1. A system comprising:
   at least one computer medium that is not a transitory signal and that comprises instructions executable by at least one processor to:
   receive, using a sound transducer, at least one voice command;
   responsive to a camera being in a first mode, establish at least one function of the camera according to the at least one voice command; and
   responsive to the camera being in an auto mode, ignore the at least one voice command, the instructions being executable to establish shutter speed, focus, and aperture in the auto mode.

2. The system of claim 1, wherein the first mode comprises at least one of Program mode, Aperture priority mode, Shutter priority mode, Manual mode.

3. The system of claim 1, wherein the first mode comprises Program mode.

4. The system of claim 1, wherein the first mode comprises Aperture priority mode.

5. The system of claim 1, wherein the first mode comprises Shutter priority mode.

6. The system of claim 1, wherein the first mode comprises Manual mode.

7. The system of claim 1, wherein the instructions are executable to:
   define at least one of the modes according to user input.

8. The system of claim 1, comprising the at least one processor implemented in the camera.

9. The system of claim 1, comprising the at least one processor implemented in a remote-control device wirelessly communicating with the camera.

10. An apparatus comprising:
    at least one processor configured with instructions to:
    receive, using a sound transducer, at least one voice command;
    responsive to a camera being in a first mode, establish at least one function of the camera according to the at least one voice command; and
    responsive to the camera being in an auto mode, ignore the at least one voice command, the instructions being executable to establish shutter speed, focus, and aperture in the auto mode.

11. The apparatus of claim 10, wherein the first mode comprises at least one of Program mode, Aperture priority mode, Shutter priority mode, Manual mode.

12. The apparatus of claim 10, wherein the first mode comprises Program mode.

13. The apparatus of claim 10, wherein the first mode comprises Aperture priority mode.

14. The apparatus of claim 10, wherein the first mode comprises Shutter priority mode.

15. The apparatus of claim 10, wherein the first mode comprises Manual mode.

16. The apparatus of claim 10, wherein the instructions are executable to:
    define at least one of the modes according to user input.

17. The apparatus of claim 10, wherein the at least one processor is implemented in the camera.

18. The apparatus of claim 10, wherein the at least one processor is implemented in a remote-control device wirelessly communicating with the camera.

19. A method comprising:
    receiving, using a sound transducer, at least one voice command;
    responsive to a camera being in a first mode, establishing at least one function of the camera according to the at least one voice command; and
    responsive to the camera being in an auto mode, ignoring the at least one voice command and establishing shutter speed, focus, and aperture.

20. The method of claim 19, wherein the method is executed in the camera, or in a remote-control device wirelessly communicating with the camera, or in the camera and in the remote-control device wirelessly communicating with the camera.

* * * * *